Figure 13:
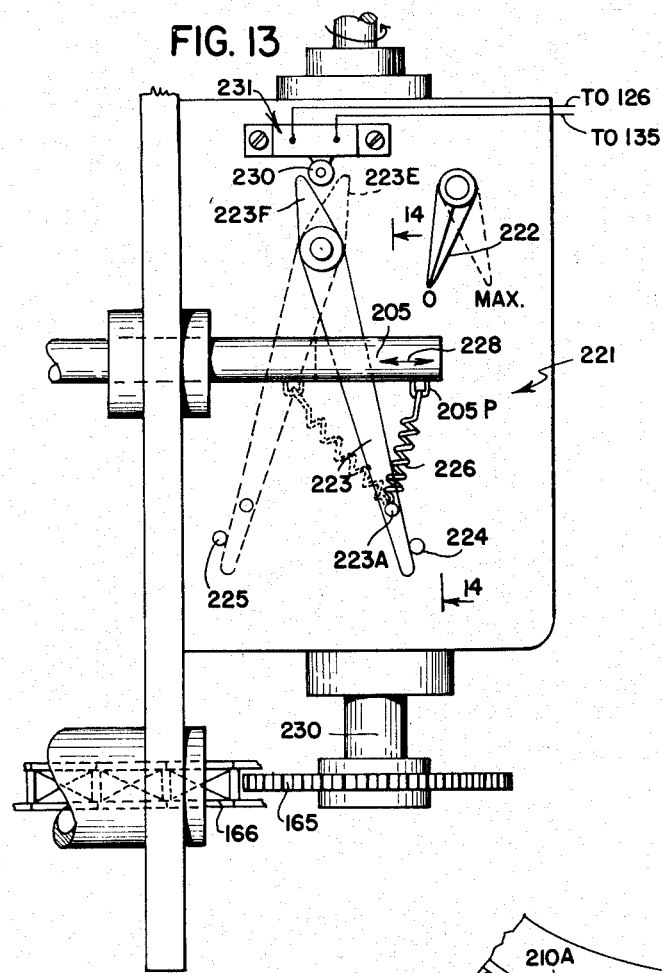

Sept. 26, 1961 V. A. WENZEL 3,002,081
METHOD AND APPARATUS FOR WELDING
Filed Oct. 5, 1960 6 Sheets-Sheet 1
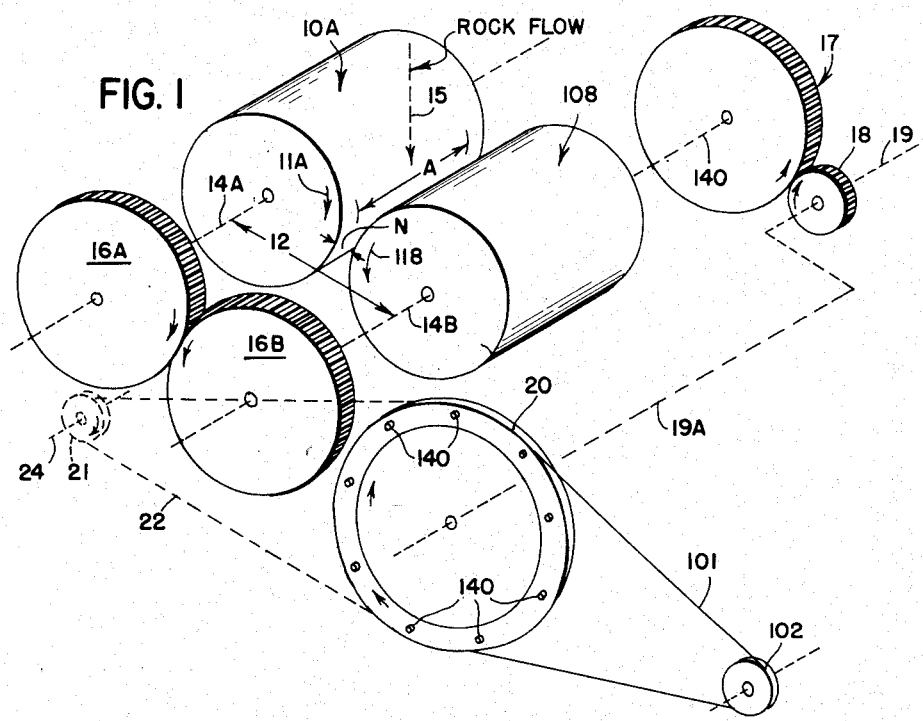
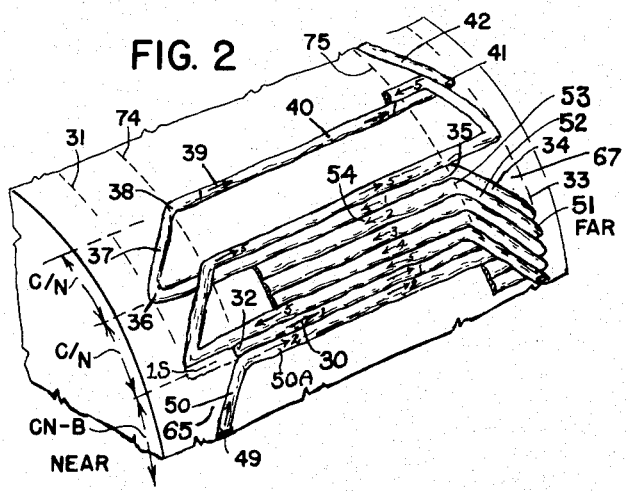
INVENTOR.
VICTOR A. WENZEL
BY
Dugger & Johnson
ATTORNEYS Sept. 26, 1961  V. A. WENZEL  3,002,081
METHOD AND APPARATUS FOR WELDING
Filed Oct. 5, 1960  6 Sheets-Sheet 2
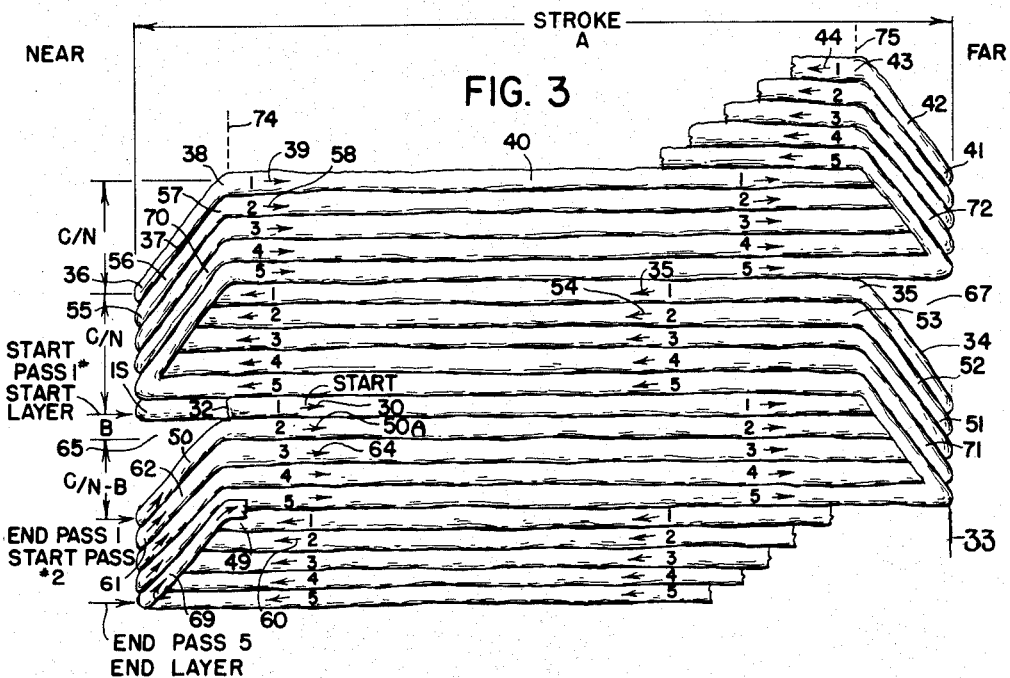
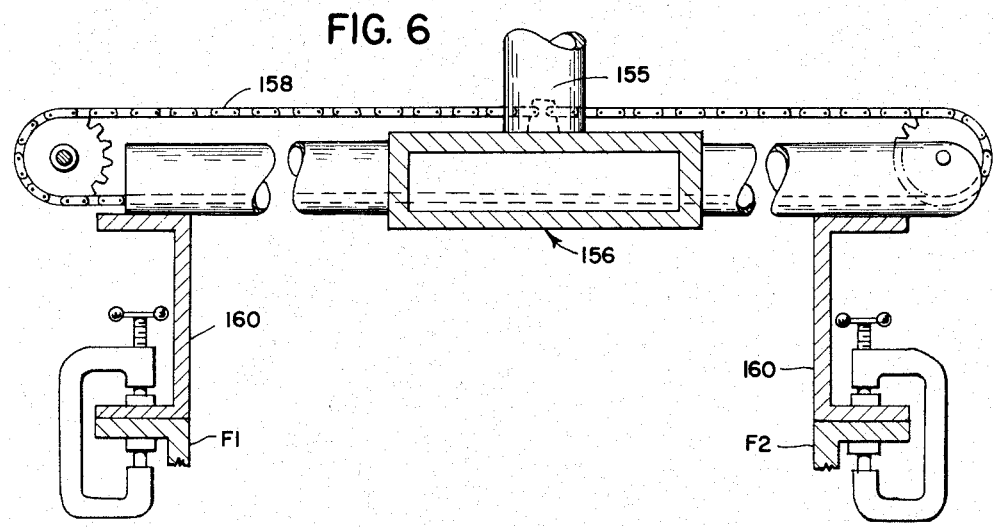
INVENTOR.
VICTOR A. WENZEL
BY
Dugger & Johnson
ATTORNEYS

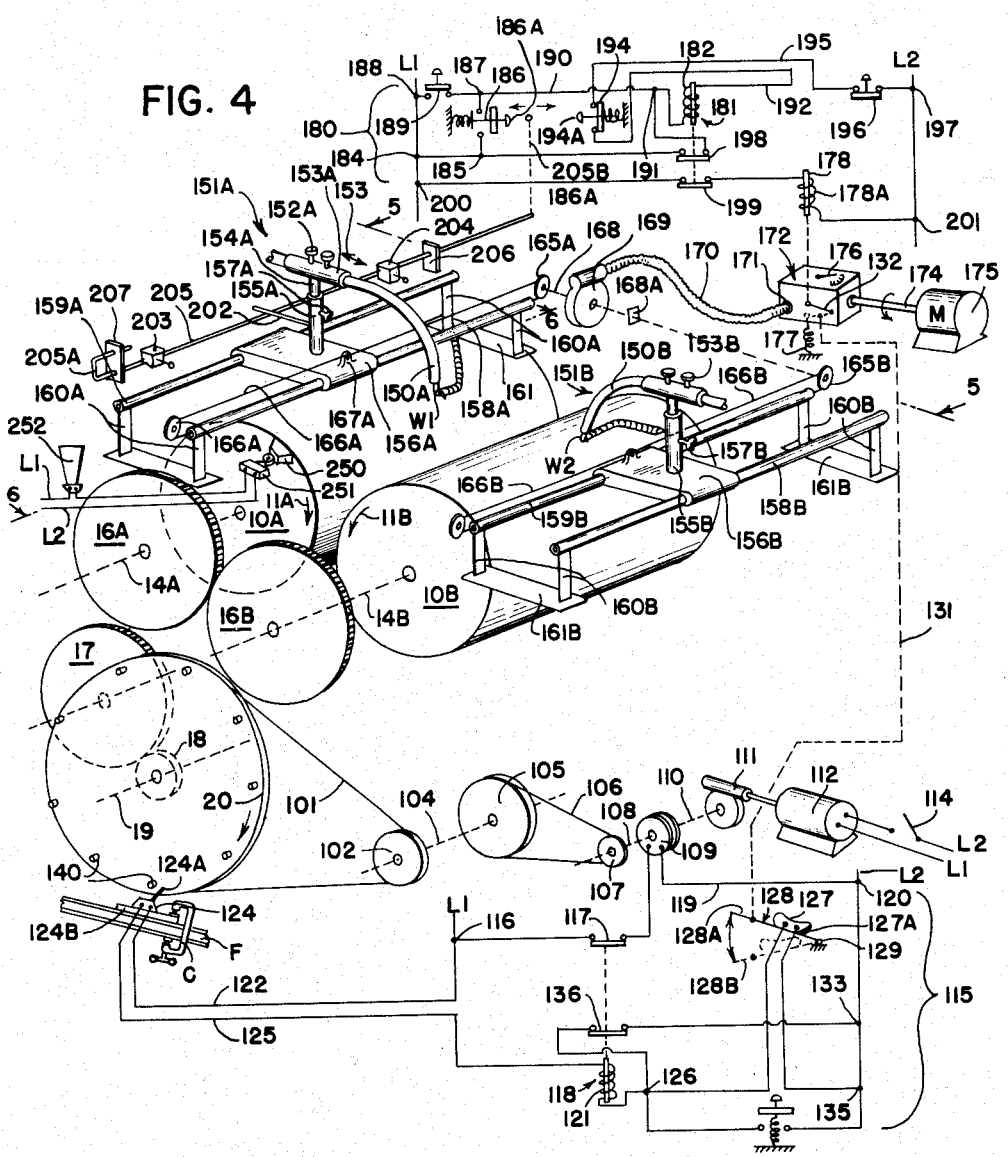

Sept. 26, 1961 V. A. WENZEL 3,002,081
METHOD AND APPARATUS FOR WELDING
Filed Oct. 5, 1960 6 Sheets-Sheet 4
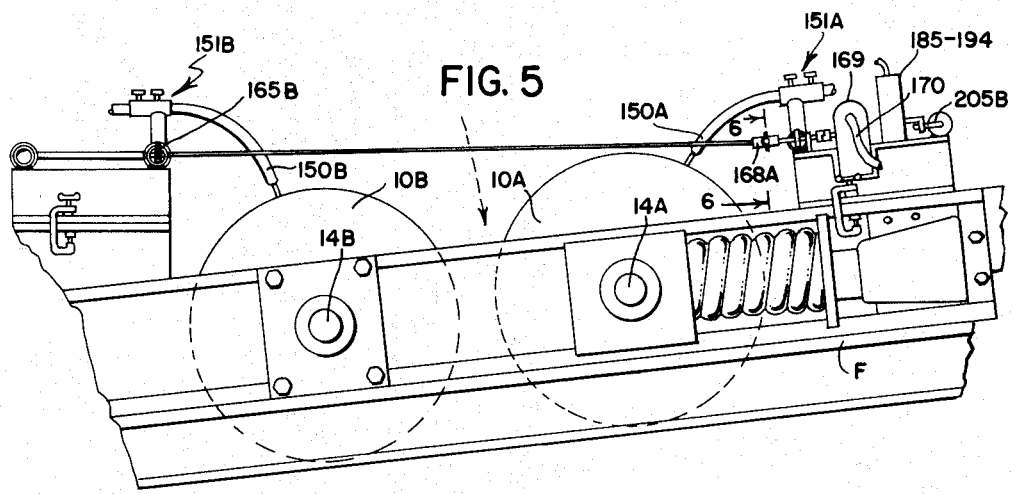
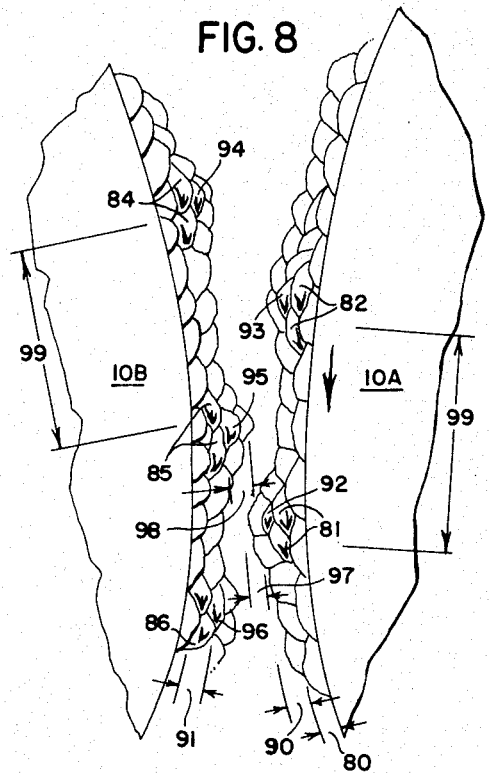
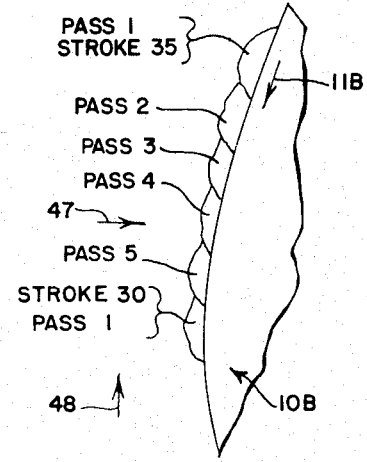
INVENTOR.
VICTOR A. WENZEL
BY
*Dugger & Johnson*
ATTORNEYS Sept. 26, 1961  V. A. WENZEL  3,002,081
METHOD AND APPARATUS FOR WELDING
Filed Oct. 5, 1960  6 Sheets-Sheet 5

INVENTOR.
VICTOR A. WENZEL

BY

*Dugger & Johnson*
ATTORNEYS

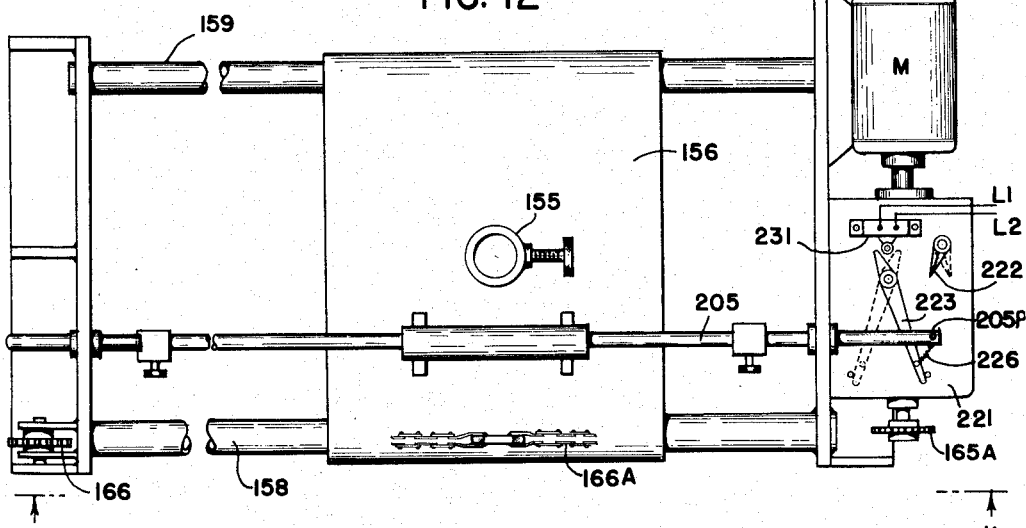
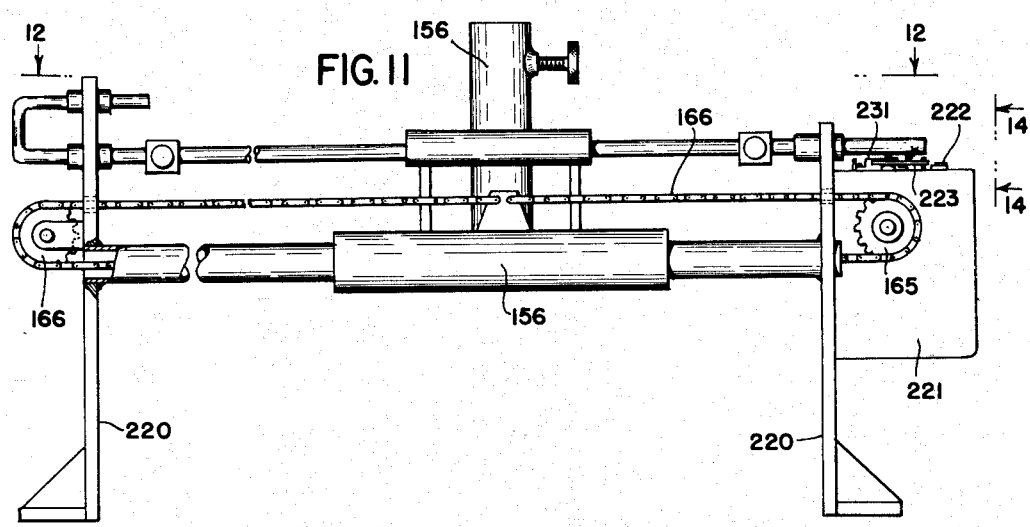

United States Patent Office 3,002,081
Patented Sept. 26, 1961

3,002,081
METHOD AND APPARATUS FOR WELDING
Victor A. Wenzel, Rosemount, Minn.
Filed Oct. 5, 1960, Ser. No. 60,664
18 Claims. (Cl. 219—76)

This invention relates to methods and apparatus for depositing one or more layers of arc weld metal on the outer surface of a roll or rollers of a roller type rock crusher or the like, during construction or repair. The situation in which the invention has principal usefulness is in the repair of roller type crushers of the type where two or more rolls are geared together so that they revolve cooperatively for crushing rock which passes between the rolls. This service is exceedingly heavy and the rock, being abrasive, causes the outer surface of the rollers to be worn away and thereby reduces the diameter and the thickness of the roller shell. After a period of service the thickness of the walls of the rollers is so reduced as to render them unservicable, and they must either be replaced or built up again by deposition of metal on the surface of the rollers.

Heretofore apparatus have been provided for depositing weld metal on the surface of rollers of rock crushers, but these have not been satisfactory because of difficulties involved in placing a sufficient quantity of weld metal on the roller. In depositing the metal the electric arc method is used and consequently there is locally generated a spot of extremely high temperatures which is requisite for the adequate deposition penetration and adherence of the bead of weld metal. This local high temperature, if too long applied to the roller, or applied according to known methods, causes distortion of the roller. Accordingly, methods heretofore available for building or repairing rollers by applying beads of weld metal to the roller have not been entirely satisfactory.

It is an object of the invention to provide method and apparatus for depositing arc weld metal on the surface of the roller without causing distortion or deterioration of the rollers. It is another object of the invention to provide method and apparatus for depositing arc weld metal by continuous method in a plurality of passes, which in the aggregate will completely cover the working area of the roller but without so concentrating the arc-deposition as to cause distortion. It is another object of the invention to provide method and apparatus for automatically depositing electric arc weld metal on the surface of rollers, including weld metal containing hard surfacing compounds such as tungsten carbide. It is a further object of the invention to provide method and apparatus for depositing electric arc weld metal on the surface of rock crusher rollers by an automatic process requiring a minimum of attention. It is the further object of the invention to provide method and apparatus for depositing electric arc weld metal on the surface of rock crusher rollers according to a prescribed pattern involving a plurality of connected strokes, which in the aggregate will form a complete pass around the roller, and in a plurality of passes around the roller in succession until a prescribed surface of the roller is covered. It is another object of the invention to provide a process and apparatus for building up the rollers of rock crusher by depositing arc weld metal in a prescribed pattern of overlapping passes, and in a plurality of layers, and to finish rollers by depositing electric arc weld metal in selected areas so as to build up these areas in the manner of undulations in a prescribed pattern for better rock crushing.

Other and further objects of this invention are those inherent in the invention herein illustrated, described in the claims and will be apparent as the description proceeds.

In accomplishment of the aforegoing and related ends, the invention then comprises the features hereinafter fully described and particularly pointed out in the claims, the description setting forth in detail certain illustrative embodiments of the invention, these being indicative, however, are but a few of the various ways of which the principals of the invention may be employed.

Figure 14:
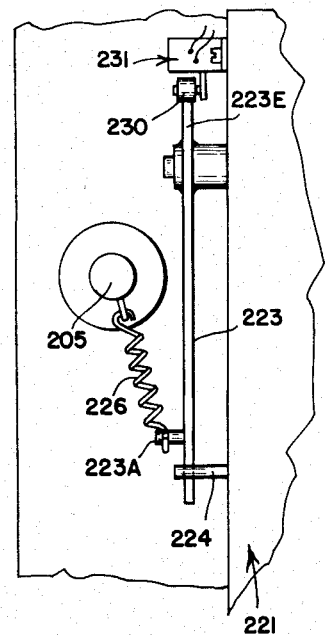
Figure 9:
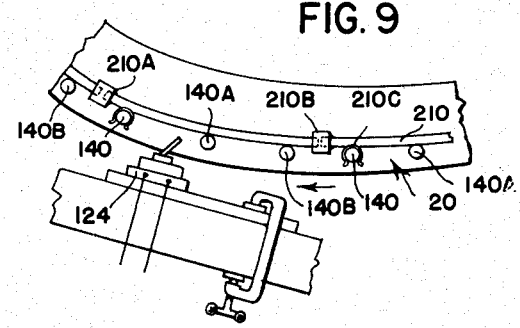
Figure 10:
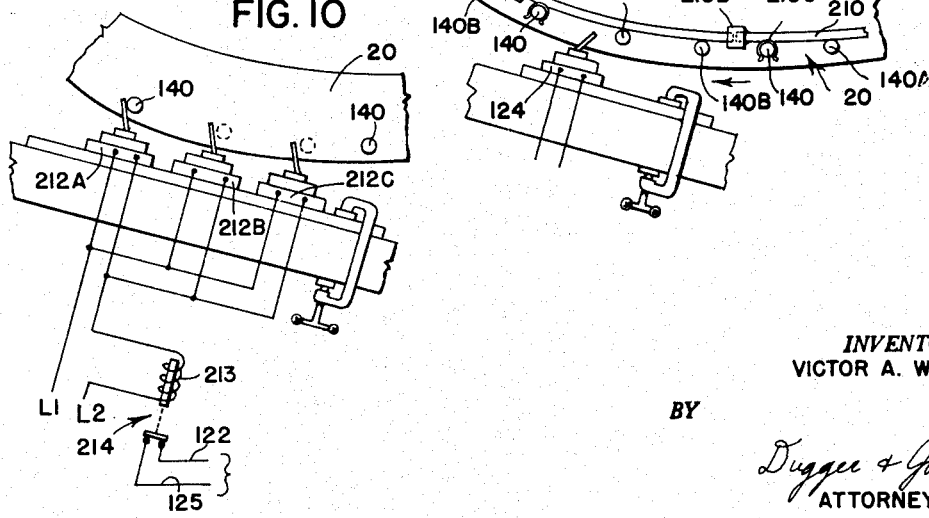

The invention is illustrated with reference to the drawings in which corresponding numerals refer to the same parts and in which:

FIGURE 1 is an isometric view of rollers of an exemplary rock crusher which can be constructed or repaired according to the present invention. FIGURE 2 is a fragmentary enlarged view of one rock crusher roller showing pattern of deposition of weld metal according to the present invention. FIGURE 3 is a plan view of the pattern of deposition of weld metal according to the present invention. In this figure the roller surface is shown generated as a flat surface. FIGURE 4 is a schematic view of the mechanical elements of the rollers and attendant circuitry of one exemplary form of mechanism of the invention. In this figure the mechanical parts are shown in isometric view, and the circuitry elements are shown in schematically. FIGURE 5 is a side elevation view of an exemplary form of the invention as in the direction of arrows 5—5 of FIGURE 4, showing the welding heads, the mountings therefor and the driving elements. FIGURE 6 is a fragmentary sectional view taken along the line of direction of arrow 6—6 of FIGURES 4 and 5. FIGURE 7 is a fragmentary end view of one of the rollers of the rock crusher showing the weld metal deposited in a plurality of passes thereon. FIGURE 8 is a fragmentary side elevational view of portions of cooperating rollers which have been repaired according to the method in using the apparatus of the present invention. FIGURE 9 is a fragmentary side elevation view of one form of control mechanism used in connection with the apparatus of FIGURE 4. FIGURE 10 is a fragmentary side elevational view of another form of control mechanism used in connection with FIGURE 4. FIGURES 11, 12, 13 and 14 are related and show a slightly modified form of apparatus of the invention. FIGURE 11 is a transverse sectional view corresponding to the view shown on FIGURE 6 taken in the direction of arrows 11-11 of FIGURE 12. FIGURE 12 is a plan view of the apparatus and is in the direction of arrows 12—12 on FIGURE 11. FIGURE 13 is a fragmentary enlarged plan view of a part of the device i.e. the motor drive and speed reducer and reversing mechanism of the apparatus shown on FIGURE 12. FIGURE 14 is a fragmentary side elevational view taken in the direction of arrows 14—14 of FIGURE 11.

Referring to the drawings, FIGURE 1 is an isometric view of a typical roll crusher of the type to which the present innvention is applicable in construction and repair. There are many forms of roll crushers and the one shown in FIGURE 1 is therefore only exemplary.

In such a roll crusher there are provided two or more crushing rolls generally designated 10A and 10B which rotate in the direction of arrows 11A and 11B. The rollers are mounted on shafts 14A and 14B with reference to each other, so that the distance 12 between the shafts 14A and 14B may be adjusted so as to increase or decrease the separation distance N, which is nip between the two rolls where the rock enters and is crushed. In FIGURE 1 this distance is shown as a fairly substantial distance, as would be the case when stones of fairly large size are being crushed, but this distance N (also 12) can be adjusted so that the roll crusher produces either "fine" or "coarse" crushed rocks. The rock flow flows downwardly in the direction of arrow 15 into the nip N and the rolls crush the rocks. There are chutes (not illustrated) in every crusher to guide the rock into that portion of the nip which is between the ends of the rolls as illustrated by the dimension A, this being the active portion of the roll. Consequently, this portion of the roll will receive the most wear.

The shafts 14A and 14B are geared together by means of the large gears 16A and 16B. The gear drive is such as to permit adjustment of distance N (and 12). One shaft (here illustrated as shaft 14B) is extended as at 14C, on one end of the roll and is provided with a large driving gear 17, which is in turn driven by the pinion 18 on the shaft 19. In the isometric view of FIGURE 1, the shaft 19 is shown deflected at 19A, merely to obtain separation for clarity of the drawing. On one end of this shaft 19 there is the large driving wheel 20, which in the usual rock crusher is belt-driven from a drive pulley 21, the belts 22 being customarily multiple V-belts of adequate capacity. The power input is at shaft 24. In use of the invention belts 22 are taken off, and a light drive belt 101 from pulley 102 is substituted, as will be described. Also, on wheel 20, or at some other place in the system of drives for rollers 10A and 10B, there are provided a plurality of indexes, here illustrated as studs 140 that are screwed into tapped holes in the rim of wheel 20.

As might be expected, the wear on the active surface A of the crusher rolls 10A and 10B will be quite considerable, and it is common for crusher rolls having an original thickness of two or two and one-half inches to be worn down to a thickness of one-half inch or thereabouts during service. When this happens, there are only two things that can be done; either the rolls must be replaced or resurfaced, and it is to the latter expedient that this invention is primarily directed.

The rolls 10A and 10B are essentially closed-end cylinders, and since the amount of metal which must be deposited for construction or repair is a large amount, as compared with the thickness of the rolls in their worn condition, there are many problems encountered. The chief problems are (1) to obtain deposition of the weld metal without undue deformation of the cylinder; (2) to obtain adequate adherence of the weld metal to the cylinder, and where there are a plurality of layers, to underlying layers of weld metal, (3) to build up the weld metal in a pattern such that during subsequent use the mill will produce fractured rather than "flaked" or "layered" rock particles, (4) to provide a process and apparatus whereby weld metal containing exceedingly hard particles (such as tungsten carbide, which enhances wear resistance) may be deposited without loss or destruction of the hard surfacing particles during the process, (5) and to do this at a cost which is compatible with economic considerations.

According to this invention it has been found that if the weld metal is deposited by laying down successive passes of weld metal on the drum with each pass consisting of connected back and forth strokes, with strokes separated from each other, that the welding heat will not be unduly concentrated in one portion of the roll and that distortion incompatible with subsequent satisfactory operation will not occur.

Referring now to FIGURES 2 and 3, according to the present invention, the bead of weld metal is produced either manually, or automatically by use of machines, and the surface of each roller is covered by a plurality of beads or passes (of weld metal) as follows: Each pass (formed as a continuous weld bead) consists of a plurality of serially connected strokes, each stroke extending from one end of the roller (which, for convenience, is called the "near end") to the other end of the roller (called the "far end"). The movement of the welder tip is parallel to the roller axis and at a uniform velocity along the roller surface and if the roller is not turned as the welder tip is moved, there would result a single line of strokes back and forth between the near and far ends of the roller, all at one line along the surface of the roller. However, at the beginning of each successive stroke the roller is abruptly rotated for a short time at a substantially uniform rate, thereby producing what is essentially a spiral which constitutes the beginning of the stroke. After the roller has been rotating for a short time the rotation of the roller is abruptly stopped and the stroke continues to the other end of the roller, thereby forming a straight line for this part of the stroke. This straight line portion is along the surface of the roller and is parallel to the axis of the roller. Upon reaching the far end of the roller, the direction of motion of the welder tip is abruptly reversed and this begins the next successive stroke of that pass, and the welder continues towards the opposite end of the roller at a substantially uniform rate of speed. Simultaneously the roller is again rotated at a substantially constant speed for a fraction of a turn and in the same direction as previously and this produces the spiral part at the beginning of this stroke, and the rotation of the roller is then abruptly halted and the stroke continues as a straight line back towards the near end of the drum. These connected, successive strokes are continued back and forth between the near and far ends of the roller, each stroke beginning with a spiral portion during which the roller is rotated through a prescribed fractional portion of a turn. As a result the straight portions of the strokes are parallel to each other but are spaced apart arcuately by the amount of turn imposed on the roller at the beginnning of each stroke.

The amount of rotation of the roller at the beginning of each stroke is a predetermined number of degrees of rotation, and this is several times the number of degrees of circumference of the roller spanned by the width of one weld bead. Thus the first "pass" (which is composed of a plurality of the aforesaid successively connected back and forth "strokes") might require any number of strokes from a small number such as eight or ten on up to a large number such as twenty-five or thirty, depending upon the circumferential size of the rock crusher roller. The parallel portions of these strokes would thus be spaced apart from each other a certain prescribed number of times the width of the bead, less overlap from bead to bead. Thus anywhere from four to twelve complete passes might be required, thus providing an equal number of parallel strokes (one stroke for each pass) laid side-by-side and slightly overlapped, to cover the roller. Each pass thus provides parallel strokes spaced from each other and each pass is laid down so its strokes are parallel to and slightly overlap the previous pass. Hence by continuing the passes, strokes are laid side-by-side and finally fill the space between the strokes of the first pass, and hence cover the drum completely. By having the successive connected strokes of each pass laid in parallel relation but arcuately spaced around the roller, the weld heat is thereby not concentrated in any one general area of the roller and the consequent heating is general and warping is reduced to an un-objectionable minimum.

Referring to FIGURES 2 and 3, it is noted that the reference numeral appearing on the weld beads are the numbers of the passes. Thus the first stroke of the first pass starts at 1S, at the near end of the roller and runs parallel to the axis of the roller in the direction of arrow 30. This straight portion of the first stroke may optionally start at the beginning line 31 of the active surface or it can be started at point 32, on line 74 which is the place where rotation normally stops (i.e. the "spiral" part of the stroke ends) during the strokes. At any rate, the first stroke of the first pass then continues to the line 33 which is at the far end of the roller, that is to say, the far end of the active surface of the roller which is worn, and is to be repaired. Upon reaching this point, the direction of motion of the welding head is abruptly reversed, and the roller is simultaneously abruptly set into rotation, thereby producing a spiral portion 34, (which in the planar "developed" view of FIGURE 3 is a straight slanting portion of the stroke). At the point 35, the rotation of the drum is abruptly stopped, and the second (or reverse) stroke of the first pass then continues directly back towards the near end of the roller until it reaches point 36 on line 31 whereupon there begins the next successive stroke. This occurs when the direction of motion of the welding tip is again abruptly reversed. At this same instant the roller is again abruptly set into rotation at a constant rate thereby producing the spiral portion 37, until the rotation is abruptly stopped at the place 38, and this stroke of pass 1 then continues in the direction of arrow 39 along the portion 40 which is toward the far end of the drum. At line 33 at the far end the first pass then continues as the next stroke as the direction of motion of the welding tip is abruptly reversed and the rotation of the roller is started at point 41. Point 41 is the beginning of the next successive stroke, which, like the other strokes, begins with a spiral portion 42, which continues until the rotation of the drum is then again abruptly stopped at 43 (see FIGURE 3), whereupon this stroke continues as a straight line portion 44 which is in the direction back towards the near end of the roller.

From the foregoing it will be noted that the arcuate distance between the straight line portions of successive strokes of pass 1 is shown by the dimension $C/N$, which is to say, the total circumference of the roller in degrees divided by a number "N." This arcuate distance, as expressed in degrees, is slightly less than the number of degrees occupied by the total number of passes (which in the illustration of FIGURES 2 and 3 is five (5) passes) needed to fill up the space between the first stroke of the first pass (at arrow 30) and the second stroke of the first pass (at arrow 30) and the second stroke of the first pass (at arrow 35). The reason this dimension $C/N$ is made slightly less than the total number of degrees spanned by the resultant (here illustrated as five (5)) passes is that the passes are laid down so that each successive pass overlaps a little bit of the edge of the succeeding pass. This is illustrated in FIGURE 7 where it will be observed that the weld metal deposited in pass 2 overlaps the weld metal of pass 1 in the region 45, and similarly pass 3 overlaps the weld metal of pass 2 in the region 46. The direction of rotation of roll 10B is shown by the arrow 11B and it will be noted that each succeeding pass overlaps that edge of the weld metal of the preceding pass which is in the direction of rotation. The reason that this is important is that the pressure exerted by a rock being crushed is in the direction of arrow 47, but there is a tendency for the rocks to be thrown upwardly in the direction of arrow 48. In the trade this is known as "squirting." The result would be that if the rock could get under the leading edge of any weld bead it would tend to tear off the weld bead in an entirety, but by making the trailing edge of succeeding passes overlap the leading edge of preceding passes, less difficulty is experienced due to the rock tending to tear off the weld metal.

Therefore, the distance $C/N$ between successive strokes of any one pass is made such that it will allow for the overlapping of the weld beads, as just described. The distance $C/N$ of successive strokes of a pass is made uniform throughout the circumference of the drum except that between the last stroke of any one pass, and the first stroke of the next pass, this distance $C/N$ is reduced by the dimension "B" as shown in FIGURE 3 between the last stroke 49 of the first pass, as compared with the first stroke 50 of the second pass. The distance is reduced by the width of one weld bead, hence designation "B," and hence the distance between the last stroke 49 of pass 1 is displayed from the first stroke 50 of pass 2 by the dimension $(C/N-B)$ as shown in FIGURE 3. Consequently the spiral portion 51 at the beginning of the first stroke 50 of pass 2 is a little shorter than at other places. In FIGURES 2 and 3 the arrows which are applied to the various strokes, bearing the numerals 1–5 are the designation of the passes and the arrows show the direction of the particular stroke in the pass. Specific numerals applied to these figures are for purposes of explanation in this text.

Thus, to continue, the first stroke 50 of the pass 2 proceeds in a direction towards the far end of the roller and during this time the roller is not rotated. Accordingly, this first stroke 50 of pass 2 is laid down in parallel and slightly overlapping relation with respect to the first stroke 30 of pass 1. The stroke 50 continues to point 51 at the far end of the roller whereupon the direction of movement of the strokes is abruptly reversed, and the rotation of the roller is abruptly started, thus producing the spiral portion 52, which continues until rotation of the roller is abruptly stopped at 53, whereupon this succeeding (connected but reverse) stroke 54 of pass 2 runs along parallel and in overlapping relation to the second stroke 35 of pass 1. Stroke 54 continues to point 55 at the near end of the roller, whereupon the direction of movement of the welding tip is abruptly reversed and the rotation of the roller is again abruptly started, thereby producing the spiral portion 56, which continues until the rotation of the roller is again abruptly halted at 57 whereupon the third stroke of pass 2 continues at 58, in parallel and overlapping relation with respect to stroke 39—40 of pass 1.

This process is continued all the way around the drum until the last stroke 60 of pass 2 results (upper part of FIGURE 3) ending at 61, and this is simultaneously the beginning of the first stroke 62 of pass 3, during which, at the beginning of this stroke, the roller is abruptly rotated, the rotation being abruptly stopped at 63, whereupon the first stroke 64 of pass 3 continues as a straight line bead of weld metal overlapping stroke 50 of pass 2.

This process which consists of successive connected strokes, constituting each pass, are laid down, until the parallel, slightly overlapped strokes fill in substantially the whole surface of the drum. It is noted that there are small triangular areas 65, 66, 67 and 68 which are left uncovered during the coating of the drum applied in the first full layer as just described composed of passes 1–5. It will also be noted that each stroke of the preceding pass runs out to either the line 31 or 33, and that the spiral portions of the successive strokes cross and thereby build up double thick areas in the regions 69, 70, 71 and 72.

However, in the next subsequent layer the portion which has been left uncovered, namely the area 65, 66, 67 and 68 will be covered double thick, and the portions which were originally covered double thick at 69, 70, 71 and 72 will be the ones which are not covered, and therefore for every two layers that are deposited on the drum the portions between the lines 31 and 74 and 33 and 75 will be given a double thick covering of weld metal. This is very desirable since it reinforces the ends of the drum and tends to make the rock move toward the more central areas between the lines 74 and 75, for adequate crushing. Furthermore the lines 31 and 33 are separated by an arbitrary dimension A, and this may be made any dimension desired when building up the surface of the roll. The dimension A may be varied as between successive layers that are put onto the drum thereby bringing the drum up to any condition of diameter desired.

The process is repeated through a plurality of layers until the desired depth of weld metal is deposited. Referring to FIGURE 8, the layer denoted by the dimension 80 is considered to be the top-most layer of a series of layers. When this condition is reached there is then deposited along the drum a second layer composed of parallel overlapping beads at 81 and 82 for roller 10A, and a similar second layer composed of beads 84 and 85 and 86 for roller 10B. This second layer, which is denoted by the dimension 90 for roller 10A and 91 for roller 10B is not a "complete" layer around the entire surface of the drum. Upon this second incomplete layer there is laid a further overlapping bead at 92, 93, 94, 95, and 96 and these beads are laid down so as to overlap each of the underlying beads in layer 90. Thus the bead 92 is placed about midway between the beads composing the layer 91. Similarly, the bead 93 is about midway between the beads composing the layer 82. In this way additional elevations are built up at these points. Then a third layer is put onto the roller covering the entire roller surface, this layer being denoted 97 in roller 10A and 98 in roller 10B. This final layer completely covers the roller and locks in all of the layers which are beneath it. This layer 97 covers but does not obliterate the undulations caused by the beads 81—92; 82—93; 84—94; 85—95 and 86—96. These undulations may be regarded as optional, but are regarded as useful, for reasons as follows:

Thus referring to FIGURE 8 there are thus produced around each of the rollers a plurality of undulations or ridges of deposited metal, these undulations being parallel to the drum axis and spaced from each other arcuately around the roller. The undulations are spaced apart by a certain radial dimension 99, which is the same for both of the rollers and they are located on the rollers so that the undulations produced at 81—92 and 82—93 of roller 10A will (when the rollers are rotated in use) be about midway between the positions of the undulations 84—94; 85—95 and 86—96 of roller 10B. This produces a configuration which is something like gear teeth in that the undulations of one roller "mesh" with those of the cooperating roller. This is quite desirable because the rocks which are being crushed will be held more firmly and will be "crushed" according to random fracturing rather than "slivered" along planar lines of cleavage of the rocks. It has been found that rocks which are "slivered" are less desirable for road building and other requirements than rock which is fractured in a random manner. Thus by depositing the weld metal on the rollers as previously described herein the slivering of the rocks is much reduced, and the amount of random fracturing of the rock is increased.

While the methods of this invention may be practiced by a skilled welder, with nothing more than a good welding machine, or welder and a helper, best results are obtained by using machines which are so especially designed as to carry out the methods of the invention. Several machines of this character and forming a part of the invention are illustrated.

Referring to FIGURE 4 there is illustrated one exemplary machine which may be used for simultaneously carrying out the invention on both rollers of a crusher having two rollers 10A and 10B, such as illustrated in FIGURE 1. In FIGURE 4 the roller 10A is driven by its gear 16A from gear 16B which is on the shaft of 14B of the roller 10B, this shaft being entirely driven by gear 17 that meshes with pinion 18 on the shaft 19. Shaft 19 also carries the main drive wheel 20 that is normally rotated by a belt 22 (see FIGURE 1). During the processing of the rollers according to the present invention, the belt 22 (FIGURE 1) is taken off, and another drive belt 101 (FIGURE 4) on the drive pulley 102 is provided. The pulley 102 is on shaft 104 which is driven by sprocket 105 driven by chain belt 106 from the small sprocket 107. The sprocket 107 is on the shaft 108 that is connected by a magnetic clutch 109 to the shaft 110 of gear reducer 111 which is driven by the constantly rotating motor 112 from power lines L1 and L2 that are controlled by the switch 114. The drive motor 112 is constantly rotated and when the clutch 109 is energized the rotation of shaft 108 is abruptly initiated and this drives sprocket 107, sprocket 105, shaft 104, pulley 102 and hence through belt 101 drive the pulley 20 of the roller shaft 14B of the crusher. This consequently causes the rotation of the rollers 10A and 10B in the same direction that they would rotate as during the crushing of rocks.

The energization of the clutch 109 is by means of a circuit shown opposite the bracket 115. The circuit extends from line L1 through junction 116 and through contacts 117 of a normally open relay 118. The circuit extends through the winding of the clutch 109 and then via line 119 to junction 120 on line L2. The relay 118 has a circuit for its coil 121 which begins at junction 116 on line L1 and extends via line 122 through a normally closed microswitch 124 and then via line 125 through the coil 121 to junction 126. From junction 126 a circuit extends through the mercury switch 127 which is mounted on a tilting arm 128 that swings around the stationary pivot 129. The tilting arm is connected by a mechanical link 131 to a similar tilting arm 132 on the combined gear reduction and reversing drive gear box 134, which will be subsequently described. The mercury switch 127 is curved and has center contacts which are bridged when the mercury runs from one end of the tube to the other, as occurs each time the arm 128 is swung up or down. Assuming that the mercury switch is closed a circuit will be completed through the coil 121, and relay 118 therefore operates closing its normally opened self-holding contacts 136 and the normally opened contacts 117. Once the relay 118 has been energized it will stay energized via a circuit from junctions 126, through contacts 136 to junction 133 on line L2. Relay 118 remains energized until its circuit is broken by the opening of the normally closed microswitch 124. The closed contacts 117 causes the energization of the magnetic clutch 109, as previously described, and hence the wheel 20 and the rollers 10A and 10B will be rotated until the switch 124 is opened. This is accomplished by having a plurality of studs 140 screwed into tapped holes placed at equal points around the rim of wheel 20. The number of pins 140 that are used depends upon the size of the rollers of the crusher, and the number of passes that are desired to be used for complete coverage. The spacing arcuately between successive studs 140 determines the dimension C/N (see FIGURES 2 and 3). It will be recalled that there is a gear reduction between shaft 14B of roller 10B and shaft 19 (pinion 18) which drives the rollers and this gear reduction is taken into consideration when figuring the angular spacing between studs 140. At any rate, the studs 140 are set in the rim of wheel 20, and the wheel 20 will be rotated, and cause rotation of the rollers 10A and 10B until the next stud 140 hits the actuator 124A of the microswitch 124 which causes the switch to open, and this de-energizes relay 118, which consequently opens and de-energizes the clutch 109 and rotation of the wheel 20 is thereupon abruptly stopped.

It will be noted that the microswitch 124 is mounted on a temporary base 124B and is held on some portion of the frame F of the rock crusher by means of an ordinary clamp C. The microswitch 124 is moved a prescribed amount along the frame during the last stroke of each pass, just prior to the beginning of the first stroke of the next pass, and this moving is measured off on the frame F, so that between the last stroke of any one pass and the first stroke of the succeeding passes, the amount of rotation of the wheel 20 (and consequently of the rollers 10A and 10B) will be such as to produce a lesser rotation in the amount (C/N–B) as shown in FIGURES 2 and 3, thereby causing the bead of the first stroke of each succeeding pass to be deposited along side and in overlapping relation to the edge of the bead of the first stroke of the preceding pass, all as previously described. The operator therefore need only adjust the position of the microswitch 124 by a prescribed amount just prior to commencement of each succeeding pass, and all of the intervening strokes of such pass will then be deposited along side and slightly overlapping the corresponding stroke of the preceding passes, all as previously described. In order that the operator does not forget to make this adjustment, a signal is provided, as will later be described.

Either one or two rollers may be conditioned at one time. If two rollers are conditioned at one time, two welding heads of standard variety are used, and these are backed up by welding generators of adequate capacity capable of continuous service. The welding heads are standard articles of merchandise and are not illustrated; neither are the welding generators since these are standard. In FIGURE 4 the simultaneous conditioning of the two rollers of the roller crusher is illustrated and consequently there are two welding heads, which are represented by the curved tubes 150A and 150B, through which the welding wires W1 and W2 are automatically fed, by automatic welding heads, not illustrated. The tubes 150A and 150B are curved down toward the surface of the rollers 10A and 10B respectively, and are mounted on an adjustable mounting head, generally designated 151A and 151B. These are similar and only one need be described in detail.

The welder head 151A has a tubular top portion 153A though which the tube 150A of the welding head extends and is held by set screw 152A. Top tube 153A is mounted on post 154A which slides in vertical tube 155A provided with lock screw 157A. This permits the welding head tip 150A to be moved back and forth in the direction of the arrow 153 and also up and down. This is important because it permits adjustment of the position of deposition of the weld metal at tip 150A as during laying down the ridge beads of weld metal 81 and 82 at certain places on roller 10A at certain portions with reference to the position of the beads 84, 85 and 86 of roller 10B, during the finishing off of the roller. The tube 155A is mounted on a carrier 156A that is arranged to slide on parallel ways 158A, 159A. These ways are supported by end posts 160A at opposite ends from frame plates 161A which are so fashioned as to be capable of being temporarily clamped to some convenient portion of the rock crusher frame as at F1 and F2, see FIGURE 6. These parallel ways 158A—159A and the supporting frames 160A—161A for them are provided for each of the welding heads 150A and 150B. On one of the ways, which is 158A of head 150A there is provided on each end, a chain sprocket as at 165A, and 166A. The sprockets are mounted on any suitable framework so that the slack side of the chain may pass through the hole in way 158A, which is tubular. The active side of the chain at 166A is fastened to a little bracket 167A on the carriage 156A. Consequently, when the chain is moved back-and-forth it will pull the carriage 156A back-and-forth, parallel to the shaft 14A of drum 10A. The back-and-forth motion of the chain is provided by the drive sprocket 165A that is on the output shaft 168 of the gear reducer 169 carrying a flexible input shaft 170 leading to the output 171 of a gear reduction and reversing gear box 172. The gear box 172 is of any standard design and its function is to provide a gear reduction from the input shaft 174 which is driven by a constantly rotating motor 175, and to provide a considerable gear reduction to its output shaft at 171, and also to provide for quick reversing of the output shaft 171, without reversing direction of rotation of motor 175. The gear reduction may be varied by means of an external manual adjustment 176 and the reversing of the output at shaft 171 is accomplished simply by moving the lever 132 up or down.

A spring is provided at 177 which normally pulls the lever 132 down, thereby providing one direction of rotation for the output shaft 171. The lever 132 is arranged to be pulled upwardly by means of a solenoid 178 which is energized or de-energized by the circuit shown opposite the bracket 180.

The circuit 80 has a relay 181, the coil 182 of which is energized through a circuit beginning at junction 184 on line L1. From junction 184 the circuit extends to junction 185. From this junction the circuit extends to a normally open limit switch 186 to junction 187. The circuit also extends from junction 188 on line L1 through the normally open manual push button 189. Accordingly, junction 187 may be energized either by the closing of the push button 189 or by closure of the limit switch 186. From junction 187 the circuit extends via line 190 to junction 191 and then through the coil 182 and line 192 and then through the normally closed limit switch 194 and via line 195 through the normally closed manual push button 196 to junction 197 on line L2. When relay 181 is energized it will close its normally opened contacts 198 and normally opened contacts 199.

The normally opened contacts 198 establish a holding circuit from junction 185 to junction 191 for the coil 182 and hence once energized relay 181 will stay energized and the circuits closed though its contacts will stay energized until its circuit is broken either by the push button 196 or by the normally closed limit switch 194. When the relay is energized contact 199 establishes circuit from junction 200 to contact 199 through the solenoid coil 178A to junction 201 on line L2. This energizes the solenoid and pulls the reversing lever 132 upwardly against the action of spring 177. This causes the output shaft 171 to rotate in a direction such that it pulls the carriage 156A to the right as shown on FIGURE 4. As the carriage moves it will carry along with it a finger bar 202, which at one position will strike an adjustable stop 204 on the rod 205, that slides back and forth in the frame brackets 206 and 207. The rod 205 has a bent over end 205A, which comes back through an upper hole in the bracket 207 at the left end, and this prevents the rod from rotating. As the rod moves to the right the end piece 205B will move against the actuator 194A of the limit switch 194 thereby opening the limit switch, and this causes the de-energization of relay 181 and hence of the solenoid 178. The spring 177 on the reversing gear lever 132 promptly pulls down the reversing lever 132, and this promptly reverses the directional rotation of the output shaft 171 and hence of the direction of motion of the entire system and the direction of motion of the carriage 156A is promptly reversed and it is started toward the left in FIGURE 4. Such movement continues until the finger bar 202 of the carriage 156A strikes against the stop 203 (at the left end of the bar 205 shown on FIGURE 4) and this causes the end 205B of that bar to move against the actuator 186A of the normally opened limit switch 186 which, when closed, causes the relay 181 to be again energized, and this causes the solenoid 178 to be energized, and the reverse lever 132 of the gear reduction and reversing drive 172 is again pulled up and the process is repeated.

Consequently, the carriage 156A is moved back-and-forth along the ways 157A and 158A.

The shaft 168 from gear back box 169 is connected to a universal coupling 168A to a similar chain sprocket 165B which drives the chain 166B back-and-forth so as to drive the carriage 156B back-and-forth, and accordingly this moves the welding head 150B which serves roller 10B back-and-forth in unison with head 150A. Both heads have exactly the same back-and-forth motion.

Every time the lever 132 of the reversing gear 172 is moved up or down it causes the lever 128 of the circuit 115 to be closed at mercury switch 127. The mercury switch 127 is a little curved tube and the contacts are in the middle. The puddle of mercury at 127A runs across the middle contacts every time the lever 128 is moved to a horizontal position as it will do when swinging from its upper position 128A to its lower position 128B and vice versa, and consequently the relay 118 is energized and picks up and causes the operation of magnetic clutch 109 one time for every movement (up or down) of the lever 128, which is to say one time for every movement of the reversing lever 132 of the back-and-forth drive mechanism for the welder heads. Consequently as the welder heads move back-and-forth, at the beginning of each stroke, the control 115 for rotating the wheel 20 is abruptly initiated to cause the rotation of the wheel 20 and the rotation continues for a certain number of degrees of rotation whereupon it is abruptly stopped (by encountering the next stud 140) and this is what causes the spiral portion of the pattern at the beginning of each successive stroke of every pass.

A number of different mountings may be provided for obtaining the lesser spacing requisite for positioning welds 81 and 82 and welds 84, 85 and 86, as shown in FIGURE 8. Two forms are shown in FIGURES 9 and 10. Thus, in FIGURE 9 a bar 210 is provided with a welder on coupling 210A at one end and a clip 210B located so as to snap onto and become fastened to one of the pins 140. This bar 110 is curved so as to follow the rim of the wheel 20. The right end of this bar at 210B sticks into the coupling 210C on the next preceding bar 210 to the right as shown in FIGURE 9. Thus each bar has one clip 210B and it supports not only that end of the bar but of the adjacent end of the succeeding bar to the left. Each of the bars 210 has two or more intermediate stops at 140A and 140B which are aligned so that they also will hit the actuating lever of the microswitch 124 as the wheel 20 is rotated. As many of these intermediate stops 140A and 140B are provided as are needed to provide the desired spacing for placing welds at places 81 and 82 and at 84, 85 and 86, see FIGURE 8, between the normal spacing for parallel portions of successive strokes from the same pass.

In FIGURE 10 the microswitch 124, which in FIGURE 4 is of the normally closed variety, is substituted by the construction of FIGURE 10 which includes a series of three spaced microswitches 212A, 212B and 212C which are spaced apart appropriately to provide the spacing between welds 81 and 82 and welds 84, 85 and 86, see FIGURE 8. All of these microswitches are normally open switches and they are engaged in succession by one of the studs 140 on the wheel 20. All of the switches 112A, 112B and 112C are wired in parallel and when any one of them is closed it will complete a circuit from line L1 through the switch which is closed and then to the coil 213 of a relay generally designated 214 which has a normally closed contact, and is wired into the same circuit 122—125, in FIGURE 4 that is closed by microswitch 124. Accordingly, as long as relay 214 is not energized the circuit will be closed but if any of the switches 112A, 112B or 112C is closed the relay 214 is momentarily energized and this opens the circuit, in the same way that the microswitch 124 would open it, with similar results.

Referring to FIGURES 11 through 14, these figures illustrate a form of machine which is the same in all respects to that shown in FIGURE 4 except for the drive mechanism for the carriages 156A and 156B. In FIGURES 11 and 12 the end brackets 160 are replaced by stronger frames 220 on which there is directly mounted the speed of reduction and reversing mechanism generally designated 221 and motor M. This reversing mechanism can very conveniently be of a hydraulic type with a self-contained hydraulic pump and hydraulic motor, together, with hydraulic valves for producing reversal of the output drive shaft. In this mechanism (which is a standard article of trade) there is provided a speed adjustment control 222, see FIGURES 12 and 13 by which the speed of the output shaft can be varied, and a reversing lever 223. This reversing lever is, in the present embodiment, provided with stop pins at 224 and 225 and it is arranged to be directly operated back and forth by the end of the rod 205. The rod 205 is provided with an eye 205P to which a spring 226 is attached, the end of this spring being attached to a pin 223A that is mounted on the lever 223. As the rod 205 is moved back and forth in the direction of arrow 228, the spring 226 will be pulled over-center, and this causes a "snap- action" movement of the lever 223, back and forth for abruptly reversing the direction of the output shaft 230, on which the chain sprocket 165A is directly mounted for moving the chain 166A that is attached to the carriage 156A. At the upper end of the lever 223 as shown in FIGURES 12 and 13, there is added an extending end 223E that is arranged so as to abut against the actuating roller 230 of a microswitch generally designated 231. This microswitch replaces the mercury switch 127 of the circuit 115, shown in FIGURE 4. Accordingly, every time that the lever 223 is moved back-and-forth it momentarily closes the microswitch 213 and this momentarily closes the circuit between junction 126 and 135 of FIGURE 4 in the same manner as mercury switch 127 does in FIGURE 4, thereby closing the initiating circuit for relay 118. This causes the rotation of the wheel 20 at the beginning of each succeeding stroke of each pass, in the manner previously described with reference to FIGURE 4.

Abrupt reversal of back-and-forth motion of the welding heads and abrupt starting and stopping of the rotational drives of rollers 10A and 10B is desirable since this prevents wandering and makes neat sharp corners wherever direction of the weld head changes.

On one roller (here illustrated as roller 10A) there is welded on a little stub 250 which acts as a cam. This is aligned with the position of the last stroke 49 of first pass 1 and this stub 250 is arranged to engage the operation of switch 251 which is adjustably clamped at a convenient place on the crusher frame. The 251 switch is wired in series with horn 252 supplied by lines L1 and L2. As the welder head reaches the last stroke it blows the horn 252 as a signal for the operator to adjust the position of the mounting for switch 124 so as to provide for a lesser rotation (distance C/N—B) needed to place the first stroke 50 of pass 2 parallel to and in slightly overlapping relation to the first stroke 30 of pass 1, see FIGURE 3, as previously described. Then the operator readjusts switch 251 to give a signal again at the last stroke 60 of pass 2 preparatory to making similar readjustment to begin pass 3, and so on.

As many apparently widely different embodiments of this invention may be made without departing from the spirit and scope thereof, it is to be understood that I do not limit myself to the specific embodiments herein.

What I claim is:

1. The method of weld-surfacing the outer surface of cylindrical rollers of roller-type rock crushers and the like for construction or repair, which comprises moving an electric arc welding tip for depositing a substantially continuous bead of weld material, said weld material being deposited in a number of passes sufficient to cover the effective area of the roll, each pass comprising a plurality of connected strokes wherein the weld material is deposited back and forth along lines of substantially equal length from adjacent one end to adjacent the other end of the roller, the strokes being straight and parallel to the roller axis when the bead of weld material is deposited when the roller is stationary and spiral when deposited when the roller is rotated, at the beginning of each stroke rotating the roller through a predetermined number of degrees of rotation, said number of degrees of rotation being several times the number of degrees of circumference of the roller spanned by the width of one weld bead, said rotations being at a substantially constant rate so as thereby to provide a spiral path of weld material throughout the first part of each stroke with the balance of the stroke parallel to the roller axis, at the beginning of each successive pass as determined by each complete revolution of the roller subsequent to the first revolution of the roller rotating said roller through a number of degrees of rotation which is sufficient to bring the weld bead of the first stroke of said successive pass closely into proximity with the weld bead of the preceding pass, and continuing the process until the whole effective area of the drum is covered with beads of weld material.

2. The method of claim 1 further characterized in that the bead of weld material of each subsequent pass is placed so as slightly to overlap and be deposited upon the adjacent edge of the bead of weld material deposited in the preceding pass.

3. The method of claim 1 further characterized in that a pair of co-operating rollers of a roller-type crusher are simultaneously surfaced.

4. The method of claim 1 further characterized in that after the whole effective area of the roller has been surfaced completely at least once, the method is repeated but is not carried to completion whereby spaced areas are surfaced each being composed of successive adjacent strokes which areas form lands upon the previously deposited surface.

5. The method of claim 4 further characterized in that the lands are built up by deposition of successive lands each of narrower width than the one beneath.

6. The method of claim 1 further characterized in that a pair of cooperating gear-connected rollers of a mill are simultaneously surfaced with at least one complete layer of material deposited as weld beads, and then on both of said rollers there are successive layers in selected areas to form lands projecting above the complete layer with the lands of one roller being deposited so as to be located between the lands of the cooperating roller when the rollers are turned in unison during crushing of rock.

7. An apparatus for surfacing the outer surface of cylindrical rollers of roller-type rock crushers and the like for construction or repair by electrically depositing beads of arc weld material thereas to cover said surface, which comprises a track, means for temporarily mounting the track adjacent the roller which is to be surfaced and parallel to the axis thereof, a carriage mounted on the track for movement back and forth thereon, welder means for automatically feeding welding material, said welder means including a welder tip mounted on the carriage for movement therewith with the tip terminating adjacent the roller surface for depositing a bead of weld material on the roller as the tip moves relative to the roller, means for moving the carriage and welder tip through connected successive strokes back and forth along the track, each stroke being as long as the axial length of the roller surface on which weld material is deposited, and roller drive means connected to the roller for rotating the roller through a predetermined number of degrees of rotation at the beginning of each stroke, said number of degrees of rotation being several times the number of degrees of circumference of the roller spanned by the width of one weld bead.

8. The apparatus of claim 7 further characterized in that the means for moving the carriage includes a constantly operating power source and a quick-reverse drive connection between said power source and said carriage.

9. The apparatus of claim 7 further characterized in that the means for moving the carriage includes a constantly operating power source and a quick-reverse hydraulic connection between said power source and said carriage.

10. The apparatus of claim 7 further characterized in that said roller drive means includes a power source and rotation start control means connected to the means for moving the carriage and to said power source for initiating rotation of the roller from said power source when the carriage begins each stroke and rotation stop-control means connected to the roller for stopping rotation of the roller after it has rotated said predetermined number of degrees of rotation.

11. An apparatus for surfacing the outer surfaces of cylindrical rollers of roller-type rock crushers and the like wherein at least two rollers are mechanically connected so as to be driven in unison for construction or repair of the rollers by electrically depositing beads of weld material thereon to cover said surface, which comprises a track means for each roller to be surfaced, means for temporarily mounting each such track, means adjacent its roller which is to be surfaced and parallel to the axis thereof, a carriage mounted on each track for movement back and forth thereon; welder means for automatically feeding welding material each said welder means including a welder tip mounted one on each of the carriages for movement therewith with the tip terminating adjacent the surface of the roller of said track and carriage, carriage drive means for moving each carriage and the welder tip thereon thru connected successive strokes back and forth along its track, each stroke being as long as the axial length of the roller surface on which weld material is to be deposited, means connecting the carriage drive means of the several carriages for moving them simultaneously back and forth, and roller drive means connected to the rollers for rotating them simultaneously through a predetermined number of degrees of rotation at the beginning of each stroke, said number of degrees of rotation being several times the number of degrees of circumference of the rollers spanned by the width of one weld bead.

12. The apparatus of claim 11 further characterized in that the means for moving each carriage comprises a constantly operating power source connected through a quick-reverse drive to the carriages.

13. The apparatus of claim 11 further characterized in that said roller drive means includes a constantly operating power source connected through a clutch to the rollers for rotating them, and control means for the clutch is provided for engaging the clutch at the beginning of each stroke of the carriages and for disengaging said clutch after the stroke is partially completed and when the rollers have rotated a predetermined number of degrees of rotation.

14. The apparatus of claim 13 further characterized in that the control means is adjustable for varying said predetermined number of degrees of rotation.

15. The apparatus of claim 13 further characterized in that alarm actuator means is provided on the roller for giving an alarm during the last stroke preceding complete rotation of the rollers.

16. An apparatus for surfacing the outer surfaces of cylindrical rollers of roller-type rock crushers and the like for construction or repair by electrically depositing beads of arc weld material thereon which crushers are of the type in which a pair of rollers are gear-connected for simultaneous rotation and are connected through a reduction gear for rotation from an input power drive wheel comprising a track for each roller and means mounting one such track adjacent each of the rollers to be surfaced and parallel to the axis thereof, a carriage mounted for back and forth stroke movement on each track, welder means on each carriage for automatically feeding welding material, each welder means including a welder tip mounted on the carriage for movement therewith with the tip adjacent its roller, carriage drive means on each track and connected to the carriage thereon for moving the carriage back and forth; interconnection drive means between the carriage drive means of each track for driving all carriages to and fro simultaneously and in unison, a power source and a reversible drive connection from it to the carriage drive means, means for automatically reversing the reversible drive connection at the end of each stroke for thereby completing one stroke and initiating the succeeding stroke, a constantaly operating power source and means including a clutch connecting it to the power drive wheel for rotating said power drive wheel when the clutch is engaged, control means connected to the clutch and to the carriage drive means so as to be operated thereby at the beginning of each stroke to engage the clutch and means responsive to a predetermined rotation of the rollers for operating said control means to disengage the clutch.

17. The apparatus of claim 16 further characterized in that said means responsive to a predetermined rotation of the rollers is manually adjustable.

18. The apparatus of claim 16 further characterized in that said means responsive to a predetermined rotation of the rollers is a control mounted so as to be responsive to the rotation of the power drive wheel.

References Cited in the file of this patent

UNITED STATES PATENTS

| | | |
|---|---|---|
| 2,187,786 | Jacobus | Jan. 23, 1940 |
| 2,427,350 | Carpenter et al. | Sept. 16, 1947 |
| 2,437,782 | Hopkins | Mar. 16, 1948 |
| 2,729,578 | Hedlund et al. | Jan. 3, 1956 |
| 2,868,165 | Altman | Jan. 13, 1959 |
| 2,914,651 | Ackerman | Nov. 24, 1959 |